US006955080B1

(12) United States Patent
Verdejo

(10) Patent No.: US 6,955,080 B1
(45) Date of Patent: Oct. 18, 2005

(54) EVALUATING OUTPUT OF A MASS AIR FLOW SENSOR

(75) Inventor: Julian R. Verdejo, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 26 days.

(21) Appl. No.: 10/809,057

(22) Filed: Mar. 25, 2004

(51) Int. Cl.⁷ .................................. G01M 15/00

(52) U.S. Cl. ................................. 73/118.2

(58) Field of Search ................. 73/116, 117.2, 73/117.3, 118.1, 118.2

(56) References Cited

U.S. PATENT DOCUMENTS

| | | | |
|---|---|---|---|
| 5,832,403 A * | 11/1998 | Kowatari et al. | 701/103 |
| 5,889,205 A * | 3/1999 | Treinies et al. | 73/118.2 |
| 6,564,785 B2 * | 5/2003 | Iwasaki | 123/568.21 |
| 2002/0189595 A1 * | 12/2002 | Iwasaki | 123/491 |
| 2004/0103880 A1 * | 6/2004 | Hirayama et al. | 123/350 |
| 2004/0260482 A1 * | 12/2004 | Tanaka et al. | 702/45 |

* cited by examiner

*Primary Examiner*—Eric S. McCall
(74) *Attorney, Agent, or Firm*—Christopher DeVries

(57) ABSTRACT

A method of evaluating output of a mass air flow sensor. The method includes integrating, over time intervals, mass air flow values corresponding to the time intervals to obtain a running sum of mass of air. The running sum is divided by a total of the time intervals to determine a net mass air flow.

24 Claims, 5 Drawing Sheets

EVALUATING OUTPUT OF A MASS AIR FLOW SENSOR

FIELD OF THE INVENTION

The present invention relates to calculating mass air flow and more particularly to evaluating an output of a mass air flow sensor.

BACKGROUND OF THE INVENTION

In a typical motor vehicle, a variety of sensors gather information that is input to an engine controller. For example, to control fuel injection, the engine controller may use the output of a mass air flow sensor (MAFS). Unlike most sensors, the MAFS typically outputs a square wave instead of an analog voltage. The frequency indicates the mass air flow passing the MAFS. The frequency of the MAFS varies nonlinearly with respect to mass air flow input between minimum and maximum frequency values.

The engine controller commonly uses an average frequency of the MAFS output signal to estimate mass air flow. For example, in one approach, the engine controller keeps a running count of rising edges of the MAFS signal that occur during a cylinder event. A cylinder event may be defined, for example, by two consecutive low-resolution (LORES) event signals. When the cylinder event ends, the engine controller divides the rising edge count (decremented by one) by a time value representing the duration of the cylinder event to obtain an average frequency value. The engine controller then accesses a lookup table (LUT) stored in memory to find a mass air flow value corresponding to the average frequency value.

Although mass air flow values derived through averaging as described above provide useful estimates of mass air flow, such estimates tend to represent only a portion of the information that may be inherent in a MAFS output signal. These mass air flow estimations do not account for the non-linearity of the relationship between MAFS frequency output and mass air flow input. Although a MAFS might be modified to produce an output that varies linearly with input, it is likely that such modification would involve adding additional processing and/or analog circuits to the MAFS. It is likely, then, that modification of a MAFS would be expensive.

SUMMARY OF THE INVENTION

The present invention, in one embodiment, is directed to a method for evaluating a signal output of a mass air flow sensor for an engine. The signal has a frequency indicative of mass air flow past the sensor. The method includes monitoring the signal output over a plurality of time intervals to determine a plurality of mass air flow values. The mass air flow values are integrated over the time intervals to obtain a running sum. The running sum is divided by a total of the time intervals to determine a net mass air flow.

In another embodiment, a control system for controlling an engine includes a mass air flow sensor that outputs a signal having a frequency indicative of mass air flow through the engine. The control system has a controller that, over a plurality of time intervals, monitors the signal output to determine a plurality of mass air flow values. The controller integrates the mass air flow values over the time intervals to obtain a running sum. The running sum is divided by a total of the time intervals to determine a net mass air flow.

The present invention, in another embodiment, is directed to a method of evaluating output of a mass air flow sensor during a time period defined relative to a cylinder event in a motor vehicle having a controller. The sensor is configured to output a digital signal having a frequency indicative of mass air flow relative to the engine. The method includes determining a time interval between two consecutive rising edges of the signal. A mass air flow value corresponding to the time interval is obtained from a table in a memory associated with the controller. The method further includes integrating the mass air flow value over the time interval to determine an incremental air mass value. The incremental air mass value is combined into a running air mass total. The method further includes dividing the running air mass total by a total of the time intervals to determine a net mass air flow. The foregoing determining, obtaining, integrating and combining are performed a plurality of times during the time period, and the dividing is performed at an end of the time period.

In yet another embodiment, a vehicle includes an engine and a mass air flow sensor that outputs a signal having a frequency indicative of mass air flow through the engine. A controller, over a plurality of time intervals, uses the output signal of the sensor to determine a plurality of mass air flow values corresponding to the time intervals. The controller integrates the mass air flow values to obtain a running sum, and divides the running sum by a total of the time intervals to determine a net mass air flow.

In still another embodiment, the present invention is directed to a method of evaluating output of a mass air flow sensor in a motor vehicle. The sensor is configured to output a signal having a frequency indicative of mass air flow relative to the motor. The method includes using at least one cylinder event of the motor to define a delta time interval. During the delta time interval, output from the sensor is used to determine a plurality of mass air flow values. The method includes integrating each of the mass air flow values over a corresponding subinterval of the delta time interval to obtain a running sum, and dividing the running sum by the delta time interval to determine a net mass air flow.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
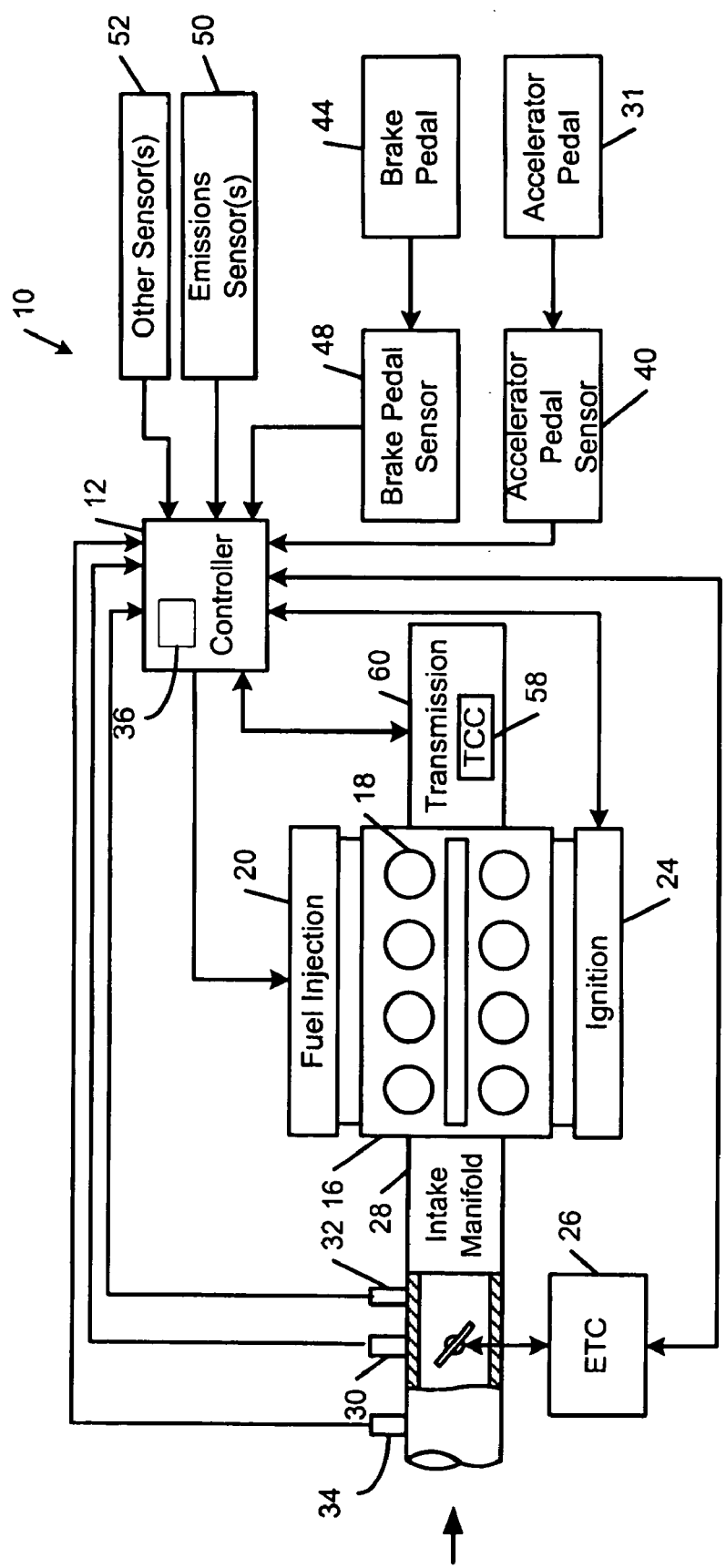
FIG. 1 is a diagram of an engine control system according to one embodiment of the present invention.

Referring now to FIG. 1, an engine control system 10 according to one embodiment of the present invention includes a controller 12 and an engine 16. The engine 16 includes a plurality of cylinders 18 each with one or more intake valves and/or exhaust valves (not shown). The engine 16 further includes a fuel injection system 20 and an ignition system 24. An electronic throttle controller (ETC) 12 adjusts a throttle area in an intake manifold 28 based upon a position of an accelerator pedal 31 and a throttle control algorithm that is executed by the controller 12. One or more sensors 30 and 32 such as a manifold pressure sensor and/or a manifold air temperature sensor sense pressure and/or air temperature in the intake manifold 28. A mass air flow sensor (MAFS) 34 senses air passing to the engine 16 as further described below.

A position of the accelerator pedal 31 is sensed by an accelerator pedal sensor 40, which generates a pedal position signal that is output to the controller 12. A position of a brake pedal 44 is sensed by a brake pedal sensor 48, which generates a brake pedal position signal that is output to the controller 12. Emissions system sensors 50 and other sensors 52 such as a temperature sensor, a barometric pressure sensor, and other conventional sensor and/or controller signals are used by the controller 12 to control the engine 16. An output of the engine 16 is coupled by a torque converter clutch 58 and a transmission 60 to front and/or rear wheels.

The MAFS 34 includes a voltage-controlled oscillator (VCO) (not shown) that outputs a signal, the frequency of which is indicative of mass air flow passing the MAFS 34. The controller 12 uses outputs of sensors such as the MAFS 34 to control a plurality of engine functions, for example, fuel injection to the cylinders 30. A lookup table 36 of mass air flow values, further described below, is stored in a memory of the engine controller 12.

Figure 2:
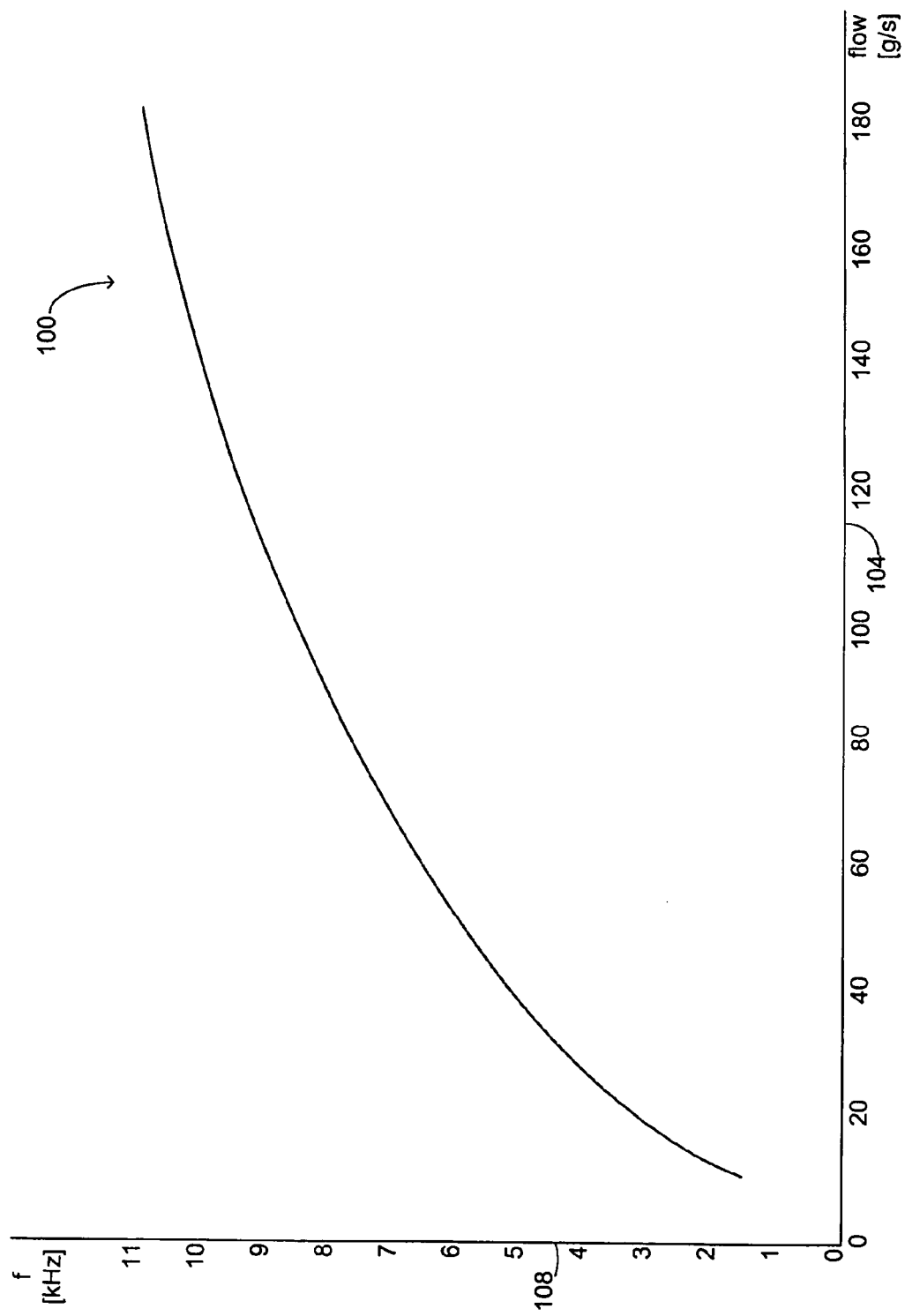
FIG. 2 is a graph of output frequency of a mass air flow sensor of an engine control system relative to mass air flow in accordance with one embodiment.

A graph indicated generally in FIG. 2 by reference number 100 illustrates mass air flow 104 (expressed in grams per second) passing the MAFS 34 relative to VCO output frequency 108 (expressed in kilohertz) of the MAFS 34. It can be seen that mass air flow 104 and output frequencies 108 of the MAFS 34 are nonlinearly related, as is typical for known mass air flow sensors.

The engine controller 12 uses the output of the MAFS 34 to obtain a mass air flow value in the following manner. In the engine 16, cylinder events are spaced, for example, 180 crank degrees apart. At 68 degrees BTDC (before top dead center), a crank signal, e.g., a LORES event, triggers a mass air flow calculation in one embodiment, as shall now be described.

Generally, in one embodiment of a method of evaluating mass air flow relative to a cylinder event, the engine controller 12 performs real-time numerical integration of values for mass of air passing the MAFS 34. The integration is performed using, for example, Euler's (also known as rectangular) or Tustin's (also known as trapezoidal) methods. A numerical integral, with respect to time, of values representing mass air flow (in grams per second) is obtained to represent a net mass of air passing the MAFS 34 (in grams). More specifically, a processor-implemented method of evaluating output of the MAFS 34 includes using the MAFS output signal over a plurality of time intervals to determine a plurality of mass air flow values. The mass air flow values are integrated over the time intervals to obtain a running sum representing a mass of air. The running sum is divided by a total of the time intervals to determine a net mass air flow.

The foregoing embodiment is further described with reference to FIG. 3, in which Euler numerical integration is indicated generally by reference number 200. A curve 202 indicates the instantaneous mass air flow passing the MAFS 34 (in grams per second) over time. Two timing diagrams 204 and 208 are shown relative to the curve 202. Timing diagram 204 indicates timing of cylinder events relative to one of the cylinders 30 (shown in FIG. 1). A cylinder event 212 is defined by two LORES events 216 and 218. The timing diagram 208 shows digital output of the MAFS 34, the frequency of which is indicative of the mass air flow shown by curve 202. The MAFS 34 signal includes a plurality of rising edges 220 and falling edges 224. The controller 12 time-stamps each rising edge 220 for use in calculations as further described below.

Figure 3:
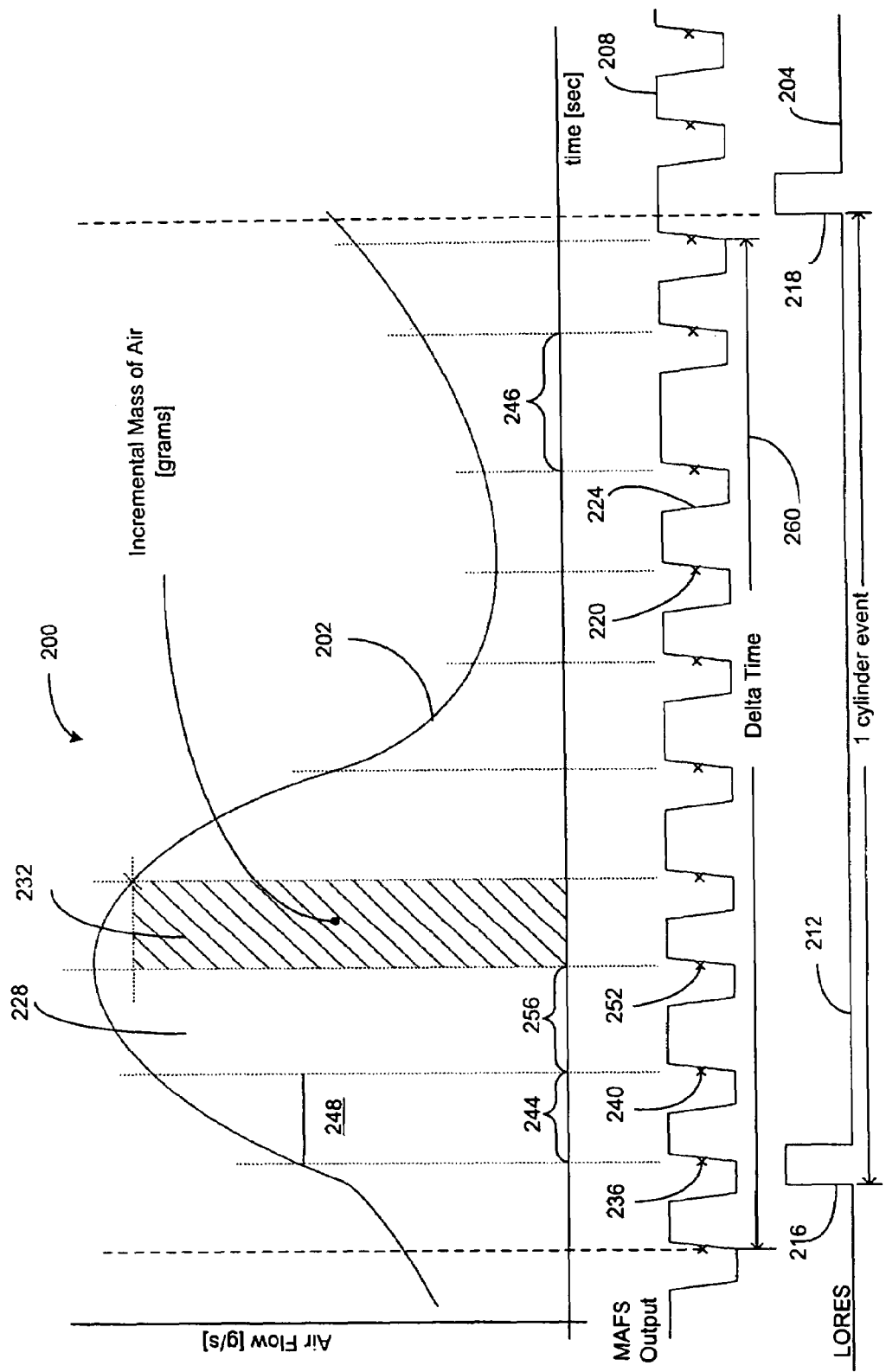
FIG. 3 is a diagram showing Euler numerical integration of mass air flow, performed relative to a mass air flow sensor output signal over one cylinder event, in accordance with one embodiment.

Generally, in one embodiment of the present invention, the engine controller 12 estimates an area 228 under the curve 202 between the LORES events 216 and 218, by integrating a plurality of rectangular "slices" 232, one of which is shown as hatched in FIG. 3. The engine controller 12 sums the areas of the slices 232. More specifically, numerical integration 200 is performed relative to LORES events 216 and 218, as shown in a flow diagram labeled as 300 in FIG. 4. When a rising edge 220 is encountered, the controller 12 calculates a time interval between the edge and a previous edge 220.

Figure 4:
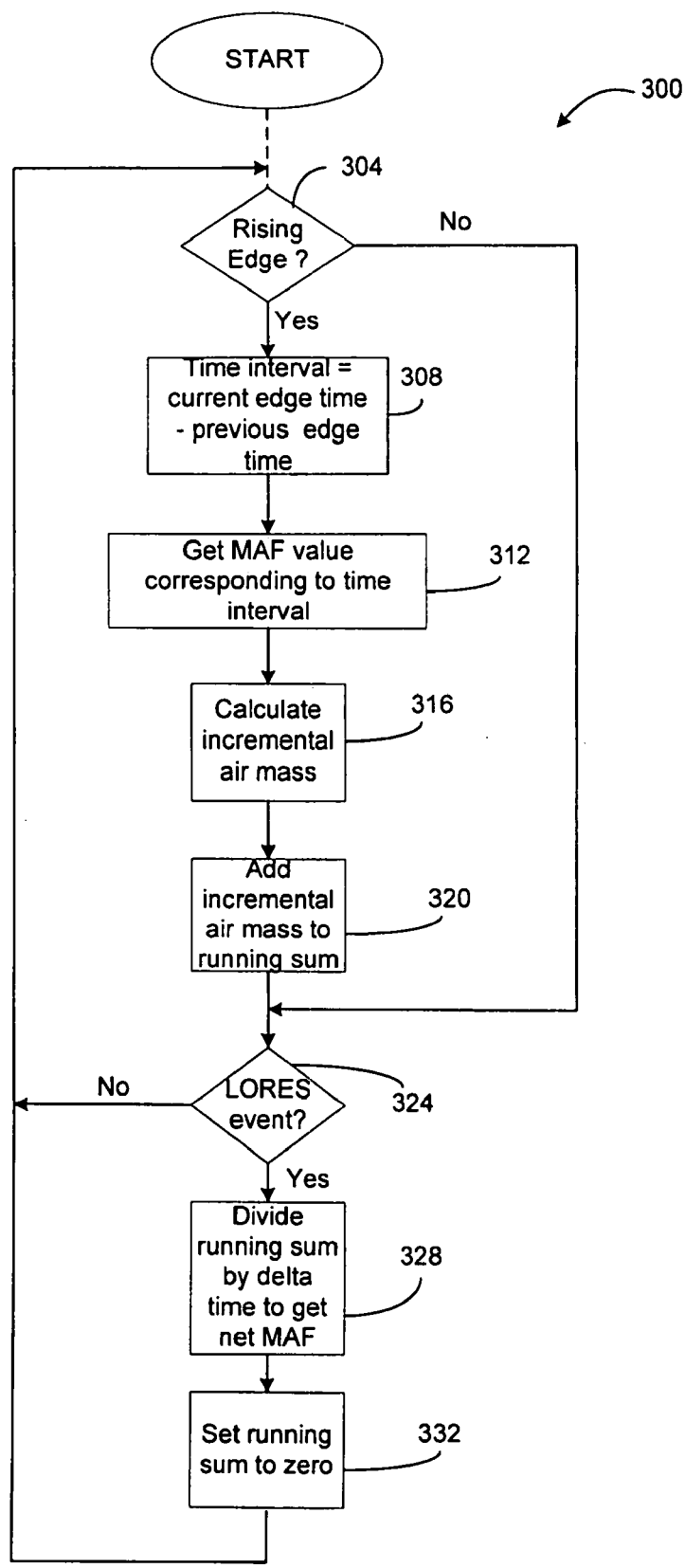
FIG. 4 is a flow diagram of a method of integrating mass air flow values over time according to one embodiment.

For example, referring to FIGS. 3 and 4, when a rising edge 240 is encountered at step 304, at step 308 the engine controller 12 calculates a time interval 244 between the edge 240 and a previous edge 236. As shown in FIG. 3, time intervals between rising edges such as the time interval 244 are referred to generally by reference number 246. It also is contemplated that, in addition to or instead of rising edges, falling edges may be used to delineate time intervals in other embodiments.

At step 312, the engine controller 12 accesses the lookup table 36 to find a mass air flow value corresponding to the time interval 244. That is, the lookup table 36 includes a plurality of time intervals and a plurality of mass air flow values corresponding to the time intervals. The table 36 is configured based, for example, on values shown in the graph 100 (shown in FIG. 2). That is, a plurality of MAFS output frequencies 108 are inverted to obtain time periods, which are associated in the table 36 with mass air flow values 104 corresponding to the frequencies 108. It will be appreciated that the table 36 may include values relating to a particular MAFS and/or values relating to a general type of MAFS. The table 36 also may vary depending, for example, on placement of a MAFS with respect to engine air flow.

Embodiments are contemplated in which less than all rising edges 220 are used to define time intervals 246 as previously described. For example, every other or every third rising edge 220 may be used in other embodiments. In such embodiments, the lookup table 36 may include mass air flow values based on such frequencies as may be defined by such time intervals 246.

At step 316, an incremental air mass is calculated. In the embodiment shown in FIG. 3, the table 36 mass air flow value corresponding to the interval 244 is multiplied at step 316 by the length of the interval 244 to yield an incremental mass of air, represented in FIG. 3 as a rectangular slice 248 under the curve 202. The incremental mass of air (represented by the area of slice 248) is added at step 320 to the running sum of mass of air. If at step 324 no LORES event is encountered, control is returned to step 304. The foregoing procedure is repeated at each rising edge 220 until a LORES event is encountered at step 324. When the LORES event 218 is encountered at step 324, at step 328 the running sum of mass of air is divided by a total length of the time intervals 246, also referred to as a delta time 260. The resulting value represents a net mass air flow past the MAFS 34 relative to the cylinder event 212. The controller 12 sets the running sum to zero at step 332 and proceeds to encounter another rising edge at step 304.

Another embodiment is described with reference to FIG. 5, in which Tustin's or trapezoidal numerical integration is indicated generally by reference number 400 and is described relative to a curve 402 and timing diagrams 404 and 408. Generally, the engine controller 12 estimates an area 428 under the curve 402 relative to LORES events 416 and 418, by integrating a plurality of trapezoidal "slices" 432, one of which is shown as hatched in FIG. 5. The engine controller 12 sums the areas of the slices 432.

Figure 5:
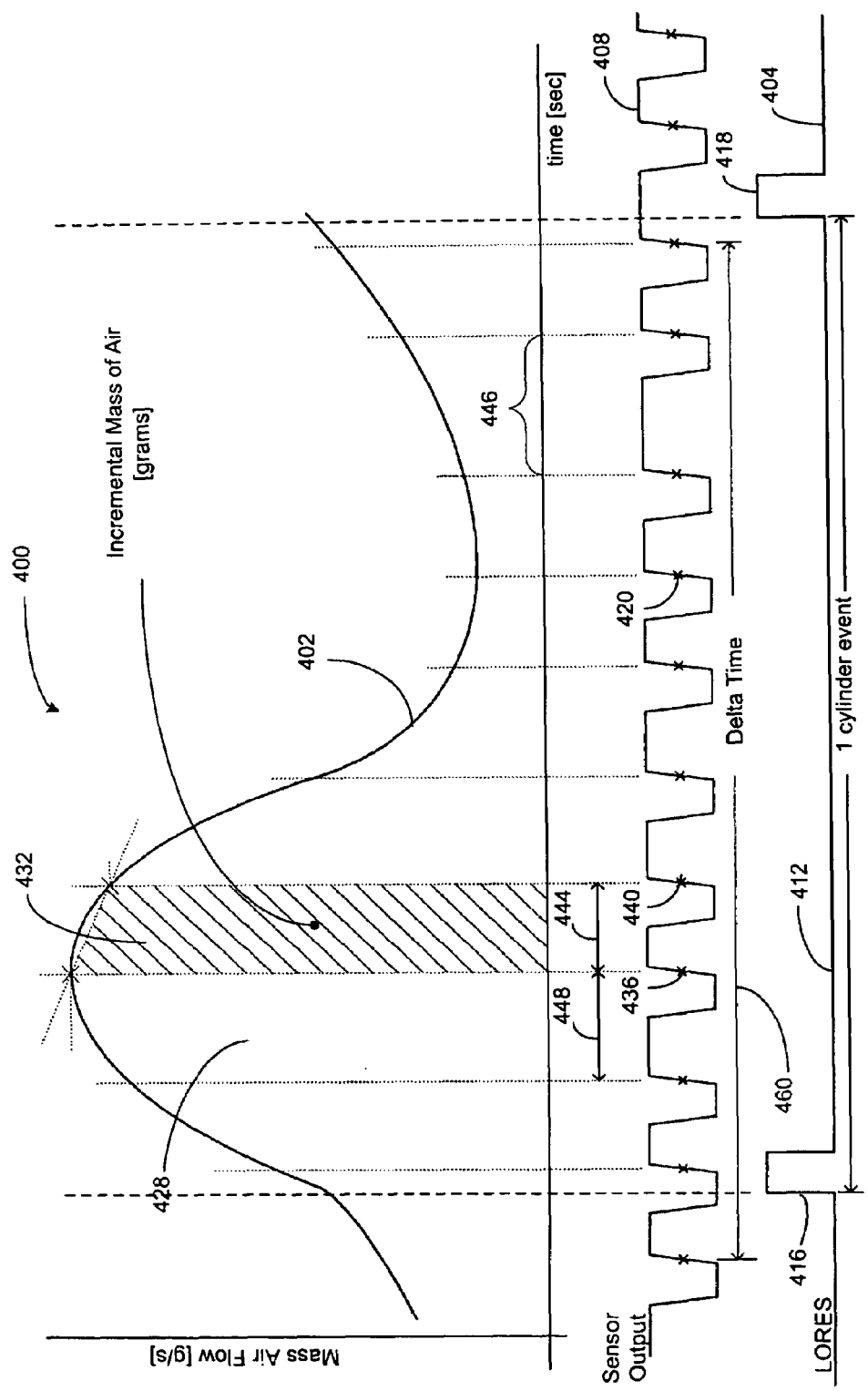
FIG. 5 is a diagram showing trapezoidal numerical integration of mass air flow, performed relative to a mass air flow sensor output signal over one cylinder event, in accordance with one embodiment.

For example, referring to FIGS. 4 and 5, when a rising edge 440 is encountered at step 304, at step 308 the engine controller 12 calculates a time interval 444 between the edge 440 and a previous edge 436. As shown in FIG. 5, time intervals between rising edges such as the time interval 444 are referred to generally by reference number 446. At step 312, the engine controller 12 accesses the lookup table 36 to find a mass air flow value corresponding to the time interval 444.

At step 316, an incremental air mass is calculated. In the embodiment shown in FIG. 5, the table 36 mass air flow value corresponding to the interval 444 is averaged with a table 36 mass air flow value corresponding to a previous interval 446, for example, the immediately preceding interval 448. The average of the mass air flow values is multiplied at step 316 by the length (in seconds) of the interval 444 to yield an incremental mass of air, represented in FIG. 5 as the shaded trapezoidal slice 432. The incremental mass of air (represented by the area of slice 432) is added at step 320 to the running sum of mass of air. If at step 324 no LORES event is encountered, control is returned to step 304. The foregoing procedure is repeated at each rising edge 420 until a LORES event is encountered at step 324. When the LORES event 418 is encountered at step 324, at step 328 the running sum of mass of air is divided by a total length of the time intervals 446, also referred to as a delta time 460. The resulting value represents a net mass air flow past the MAFS 34 during that cylinder event 412. The controller 12 sets the running sum to zero at step 332 and proceeds to encounter another rising edge at step 304.

Additional embodiments are contemplated wherein integration is performed in various ways relative to cylinder events. For example, integration may be initiated and/or terminated at a selected number of signal edges after and/or before a cylinder event.

The above described methods and systems make it possible to gain more accurate information from a mass air flow sensor than would be available using current air flow estimation methods. Embodiments of the present invention can be implemented, for example, by programming an engine controller or other processor. The foregoing methods and systems can be implemented with existing mass air flow sensors, do not entail hardware changes and thus are easy and inexpensive to implement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A method for evaluating a signal output of a mass air flow sensor for an engine, the signal having a frequency indicative of mass air flow past the sensor, said method comprising:
   monitoring the signal output over a plurality of time intervals to determine a plurality of mass air flow values;
   integrating said mass air flow values over said time intervals to obtain a running sum; and
   dividing said running sum by a total of said time intervals to determine a net mass air flow.

2. The method of claim 1 further comprising using edges of the signal to define said time intervals.

3. The method of claim 2 further comprising defining said time intervals relative to a cylinder event of the engine.

4. The method of claim 1 wherein said integrating step comprises:
   using one of said time intervals to obtain, from a table stored in a memory associated with a processor, a corresponding mass air flow value;
   multiplying said corresponding mass air flow value by said one of said time intervals to determine an incremental air mass value; and
   combining said incremental air mass value into said running sum.

5. The method of claim 4 wherein said integrating step further comprises using a trapezoidal method to determine said incremental air mass value.

6. The method of claim 1 wherein said integrating step comprises using at least one of a rectangular integration method and a trapezoidal integration method.

7. A control system for controlling an engine comprising:
   a mass air flow sensor that outputs a signal having a frequency indicative of mass air flow through the engine; and
   a controller that:
   over a plurality of time intervals, monitors the signal output to determine a plurality of mass air flow values;
   integrates said mass air flow values over said time intervals to obtain a running sum; and
   divides said running sum by a total of said time intervals to determine a net mass air flow.

8. The control system of claim 7 wherein said controller uses edges of the signal to define said time intervals.

9. The control system of claim 8 wherein said controller defines said time intervals relative to a cylinder event of the engine.

10. The control system of claim 7 wherein said controller comprises a memory and:
    uses one of said time intervals to obtain, from a table in said memory, a corresponding mass air flow value;
    multiplies said corresponding mass air flow value by the one of the time intervals to determine an incremental air mass value; and
    combines said incremental air mass value into said running sum.

11. The control system of claim 10 wherein said controller uses a trapezoidal method to determine said incremental air mass value.

12. The control system of claim 7 wherein said controller uses at least one of a rectangular integration method and a trapezoidal integration method.

13. A method of evaluating output of a mass air flow sensor during a time period defined relative to a cylinder event in a motor vehicle having a controller, the sensor configured to output a digital signal having a frequency indicative of mass air flow relative to the engine, said method comprising:
   determining a time interval between two consecutive rising edges of the signal;
   obtaining, from a table in a memory associated with the controller, a mass air flow value corresponding to said time interval;
   integrating said mass air flow value over said time interval to determine an incremental air mass value;
   combining said incremental air mass value into a running air mass total; and
   dividing said running air mass total by a total of said time intervals to determine a net mass air flow;
   wherein said determining, obtaining, integrating and combining are performed a plurality of times during said time period, and said dividing is performed at an end of said time period.

14. The method of claim 13 wherein integrating comprises using at least one of a rectangular method and a trapezoidal method.

15. The method of claim 13 further comprising using consecutive LORES events to define said time period.

16. The method of claim 13 further comprising defining said time period as the cylinder event.

17. A vehicle comprising:
   an engine;
   a mass air flow sensor that outputs a signal having a frequency indicative of mass air flow through the engine; and
   a controller that:
   over a plurality of time intervals, uses the output signal of said sensor to determine a plurality of mass air flow values corresponding to said time intervals;
   integrates said mass air flow values to obtain a running sum; and
   divides said running sum by a total of said time intervals to determine a net mass air flow.

18. The vehicle of claim 17 wherein said controller uses rising edges of the digital signal to define said time intervals.

19. The vehicle of claim 17 wherein said controller defines a total of said time intervals relative to a cylinder event of the engine.

20. The vehicle of claim 17 wherein said controller comprises a memory and:
   uses one of said time intervals to obtain, from a table stored in said memory, a corresponding mass air flow value;
   multiplies said corresponding mass air flow value by said one of said time intervals to determine an incremental air mass value; and
   combines the incremental air mass value into said running sum.

21. The vehicle of claim 20 wherein said controller uses a trapezoidal method to determine the incremental air mass value.

22. The vehicle of claim 17 wherein said controller uses at least one of a rectangular integration method and a trapezoidal integration method.

23. A method of evaluating output of a mass air flow sensor in a motor vehicle, the sensor configured to output a signal having a frequency indicative of mass air flow relative to the motor, said method comprising:
   using at least one cylinder event of the motor to define a delta time interval;
   during said delta time interval, using output from the sensor to determine a plurality of mass air flow values;
   integrating each of said mass air flow values over a corresponding subinterval of said delta time interval to obtain a running sum; and
   dividing said running sum by said delta time interval to determine a net mass air flow.

24. The method of claim 23 further comprising using two edges of the sensor output signal to define one of said subintervals.

* * * * *